US012493149B2

(12) United States Patent
Smith

(10) Patent No.: US 12,493,149 B2
(45) Date of Patent: Dec. 9, 2025

(54) CYCLIC CORE VARIANCE SYSTEM

(71) Applicant: Ortronics, Inc., New London, CT (US)

(72) Inventor: Daniel M. Smith, Westerly, RI (US)

(73) Assignee: Legrand DPC, LLC, Ringgold, VA (US)

( * ) Notice: Subject to any disclaimer, the term of this patent is extended or adjusted under 35 U.S.C. 154(b) by 0 days.

(21) Appl. No.: 16/390,582

(22) Filed: Apr. 22, 2019

(65) Prior Publication Data

US 2019/0324208 A1 Oct. 24, 2019

Related U.S. Application Data

(60) Provisional application No. 62/661,466, filed on Apr. 23, 2018.

(51) Int. Cl.
*G02B 6/25* (2006.01)

(52) U.S. Cl.
CPC ..................... *G02B 6/25* (2013.01)

(58) Field of Classification Search
CPC ............ C03B 2203/18; C03B 2205/13; C03B 37/02763; C03B 2203/10; C03B 37/0124; C03B 37/01245; C03B 37/012; C03B 37/0253; C03B 37/027; H01S 3/06745; G02B 6/25; G02B 6/2552; G02B 6/02042; B29D 11/00721; B33Y 80/00
(Continued)

(56) References Cited

U.S. PATENT DOCUMENTS 219,617 A * 9/1879 Cady .................... B23D 19/065
83/333
1,172,067 A * 2/1916 Spiegel ................. A41B 13/04
83/46
(Continued)

FOREIGN PATENT DOCUMENTS

DE          3637205    *  5/1988   ............... G02B 6/44
JP       2010163339 A      7/2010
WO     WO-9706457 A1 *  2/1997   ........ C03B 37/01205

OTHER PUBLICATIONS

Oxford Languages, "fabricate," available at: https://www.google.com/search?q=fabricate+definition&rlz=1C1GCEA_en&oq=fabricate+def&aqs=chrome.0.0i512j69i57j0i512l2j0i10i512l3j0i512j0i22i30j0i15i22i30.8665j1j1&sourceid=chrome&ie=UTF-8, on Apr. 18, 2023.*

(Continued)

*Primary Examiner* — Jonathan G Riley
(74) *Attorney, Agent, or Firm* — McCarter & English, LLP

(57) ABSTRACT

The present disclosure provides improved optical devices (e.g., discrete passive optical devices), and improved systems/methods for fabricating such optical devices. Systems/methods are provided for fabricating discrete passive optical devices by utilizing an advantageous cyclic core variance fabrication process/method. The cyclic core variance process/method employs a continuous process, but instead of having one constant core profile of the optical fiber, the core profile of the optical fiber varies cyclically, going back and forth between two or more core profile zones, with a gradual and properly-shaped transition zone in between. The core profile zones and transition zone can be custom formed (e.g., user-defined) to fabricate a variety of optical effects of the optical devices as desired, allowing a large variety of optical devices to be fabricated utilizing the exemplary cyclic core variance process/method.

17 Claims, 4 Drawing Sheets

(58) Field of Classification Search
USPC .............................................. 83/333
See application file for complete search history.

(56) References Cited

U.S. PATENT DOCUMENTS

| | | | | |
|---|---|---|---|---|
| 2,530,319 | A * | 11/1950 | Young | B26D 3/10 83/430 |
| 2,759,542 | A * | 8/1956 | Weisshuhn | B26D 3/10 83/429 |
| 3,779,628 | A * | 12/1973 | Kapron | G02B 6/4203 385/43 |
| 3,875,837 | A * | 4/1975 | Dussaud | B26D 1/00 83/46 |
| 4,008,061 | A | 2/1977 | Ramsay | |
| 4,049,413 | A * | 9/1977 | French | C03B 37/018 65/61 |
| 4,743,086 | A * | 5/1988 | Hicks, Jr. | G01M 11/35 356/73.1 |
| 5,100,507 | A * | 3/1992 | Cholewa | G02B 6/262 216/97 |
| 5,239,176 | A * | 8/1993 | Stevenson | G01N 21/552 250/227.21 |
| 5,381,503 | A * | 1/1995 | Kanamori | G02B 6/2552 385/123 |
| 5,729,643 | A * | 3/1998 | Hmelar | G02B 6/2551 385/98 |
| 5,970,197 | A * | 10/1999 | Pavlath | G02B 6/02 385/144 |
| 6,125,225 | A * | 9/2000 | Dianov | G02B 6/2552 385/124 |
| 6,220,329 | B1 * | 4/2001 | King | B32B 3/02 156/512 |
| 6,275,627 | B1 * | 8/2001 | Wu | G02B 6/2551 385/28 |
| 6,301,934 | B1 * | 10/2001 | Dobbins | C03B 37/02736 65/412 |
| 6,523,368 | B2 * | 2/2003 | Lee | G02B 6/02271 385/124 |
| 6,768,825 | B2 * | 7/2004 | Maron | G01L 1/246 385/13 |
| 6,840,682 | B2 * | 1/2005 | Terasawa | G02B 6/266 385/59 |
| 6,913,718 | B2 * | 7/2005 | Ducker | A61F 13/15723 264/138 |
| 8,089,689 | B1 | 1/2012 | Savage-Leuchs | |
| 8,196,793 | B2 * | 6/2012 | Ohmura | B26F 3/002 225/2 |
| 9,484,706 | B1 * | 11/2016 | Koponen | H01S 3/06708 |
| 9,972,961 | B2 * | 5/2018 | Sipes, Jr. | H01S 3/06712 |
| 10,114,172 | B2 * | 10/2018 | Holland | G02B 6/02004 |
| 2002/0094159 | A1 * | 7/2002 | Goldberg | H01S 3/067 385/27 |
| 2003/0180016 | A1 * | 9/2003 | Yamada | G02B 6/2552 385/96 |
| 2003/0223693 | A1 * | 12/2003 | Tallent | C03C 25/607 385/39 |
| 2005/0056952 | A1 * | 3/2005 | Walker | B29C 48/12 264/1.29 |
| 2007/0237453 | A1 * | 10/2007 | Nielsen | G02B 6/02338 385/28 |
| 2007/0280597 | A1 * | 12/2007 | Nakai | G02B 6/2835 385/43 |
| 2008/0267229 | A1 * | 10/2008 | Kojima | G02B 6/02066 372/6 |
| 2009/0202189 | A1 * | 8/2009 | Sugamata | G02F 1/2255 385/1 |
| 2010/0044406 | A1 * | 2/2010 | Ohmura | G02B 6/25 225/2 |
| 2010/0278486 | A1 | 11/2010 | Holland et al. | |
| 2010/0310219 | A1 * | 12/2010 | Bookbinder | C03B 37/01453 451/41 |
| 2012/0127563 | A1 * | 5/2012 | Farmer | G02B 6/14 359/341.3 |
| 2012/0207435 | A1 * | 8/2012 | Murphy | H01S 3/06745 385/39 |
| 2014/0361452 | A1 * | 12/2014 | Zheng | B29D 11/00721 264/1.24 |
| 2015/0055913 | A1 | 2/2015 | Imoto | |
| 2016/0020573 | A1 * | 1/2016 | Watanabe | H01S 3/06783 359/341.3 |
| 2017/0191314 | A1 * | 7/2017 | Faircloth | H01S 3/0941 |
| 2018/0188458 | A1 * | 7/2018 | Law | G02B 6/4206 |
| 2019/0175407 | A1 * | 6/2019 | Bacher | A61F 9/00821 |
| 2020/0041724 | A1 * | 2/2020 | Kopp | G02B 6/2808 |

OTHER PUBLICATIONS

Extended European Search Report from related European Patent Application No. 19177600.4 issue Nov. 11, 2019.
Office Action from related European Patent Application No. 22151661.0 issued Mar. 21, 2024.

* cited by examiner

CYCLIC CORE VARIANCE SYSTEM

CROSS-REFERENCE TO RELATED APPLICATIONS

This application claims the benefit of U.S. Provisional Application entitled "CYCLIC CORE VARIANCE SYSTEM," which was filed on Apr. 23, 2018, and assigned Ser. No. 62/661,466, the contents of which are herein incorporated by reference in their entirety.

FIELD OF THE DISCLOSURE

The present disclosure relates to optical devices (e.g., discrete passive optical devices) and related systems and methods of fabrication and, more particularly, to discrete passive optical devices fabricated from a cyclic core variance process/method.

BACKGROUND OF THE DISCLOSURE

In general, conventional optical fiber is produced using a constant core profile embedded within a cladding with a higher index of refraction. This allows long, continuous runs of optical fiber to be produced at acceptable cost.

Some conventional direct mating of certain fiber types (e.g., between OM1 fiber, which has a 62.5 μm core diameter, and OM3 fiber, which has a slightly smaller 50 μm core diameter) involves a connection with a core mismatch, thereby leading to large insertion loss (e.g., about 3.5 dB) and high signal reflection when going from the larger diameter fiber (e.g., OM1 fiber) to the smaller diameter fiber (e.g., OM3 fiber).

Moreover, current splitter technology (e.g., for a 1×4 optical splitter) has symmetrical loss, that is, the loss in the splitting direction can be equal to that in the merging direction.

For example, a basic element of both a fused biconical taper (FBT) and a planar lightwave circuit (PLC) is actually a 2×2 splitter element, with one of the input ends cut away. This lead still collects its share of energy in the merging direction, but this energy is simply lost.

Thus, an interest exists for improved optical devices, and related systems and methods of fabrication.

These and other inefficiencies and opportunities for improvement are addressed and/or overcome by the systems, methods and assemblies of the present disclosure.

SUMMARY OF THE DISCLOSURE

The present disclosure provides advantageous optical devices (e.g., discrete passive optical devices), and improved systems and methods for fabricating such optical devices. More particularly, the present disclosure provides improved systems and methods for fabricating discrete passive optical devices by utilizing an advantageous cyclic core variance fabrication process/method.

In general, the advantageous cyclic core variance process/method of the present disclosure employs a continuous process, but instead of having one constant core profile of the optical fiber, the core profile of the optical fiber varies cyclically, going back and forth between two or more core profile zones a plurality of times along the length of the optical fiber, with a transition zone (e.g., a gradual and properly-shaped transition zone) in between each successive varied core profile zone of the optical fiber.

The core profile zones and transition zone TZ can be custom formed (e.g., user-defined) to produce/fabricate a variety of optical effects of the fabricated optical devices as desired, thereby allowing a large variety of optical devices to be fabricated utilizing the exemplary cyclic core variance process/method of the present disclosure.

The present disclosure provides for a method for fabricating an optical device including providing an optical fiber, the optical fiber having two or more core profile zones that vary cyclically a plurality of times along the length of the optical fiber, with transition zones in between each successive varied core profile zone of the optical fiber.

The present disclosure also provides for a method for fabricating an optical device further including cleaving the optical fiber at a first core profile zone; and cleaving the optical fiber at a second core profile zone, with a first transition zone extending from the first core profile zone to the second core profile zone; wherein the first core profile zone is different than the second core profile zone.

The present disclosure also provides for a method for fabricating an optical device wherein the first core profile zone has a first core diameter, and the second core profile zone has a second core diameter, the first core diameter different than the second core diameter. The present disclosure also provides for a method for fabricating an optical device wherein the first core diameter is about 62.5 μm, and the second core diameter is about 50 μm.

The present disclosure also provides for a method for fabricating an optical device wherein the optical fiber is a glass optical fiber. The present disclosure also provides for a method for fabricating an optical device wherein the optical fiber is a plastic optical fiber.

The present disclosure also provides for a method for fabricating an optical device wherein the first transition zone includes a transition zone core diameter that tapers from the first core diameter of the first core profile zone to the second core diameter of the second core profile zone.

The present disclosure also provides for a method for fabricating an optical device further including cleaving the optical fiber at a third core profile zone and cleaving the optical fiber at a fourth core profile zone, with a second transition zone extending from the third core profile zone to the fourth core profile zone.

The present disclosure also provides for a method for fabricating an optical device wherein the third core profile zone is substantially the same as the first core profile zone, and the fourth core profile zone is substantially the same as the second core profile zone.

The present disclosure also provides for a method for fabricating an optical device wherein the first core profile zone extends from a first cleaved end to a first transition point positioned proximal to a first end of the first transition zone; wherein the second core profile zone extends from a second cleaved end to a second transition point positioned proximal to a second end of the first transition zone; and wherein the first transition zone extends from the first transition point to the second transition point.

The present disclosure also provides for a method for fabricating an optical device wherein the optical fiber is cleaved at the mid-point of the first core profile zone, and the optical fiber is cleaved at the mid-point of the second core profile zone.

The present disclosure also provides for a method for fabricating an optical device wherein the first and second core diameters are surrounded by cladding.

The present disclosure also provides for a method for fabricating an optical device wherein the first core profile zone has a first core diameter, and the second core profile zone has a second core diameter, the first core diameter different than the second core diameter; wherein the first core diameter extends from the first cleaved end to the first transition point, and the second core diameter extends from the second cleaved end to the second transition point.

The present disclosure also provides for a method for fabricating an optical device wherein the transition zone core diameter is connected to and extends from the first core diameter to the second core diameter, with the transition zone core diameter tapering from the first core diameter to the second core diameter. The present disclosure also provides for a method for fabricating an optical device wherein the first core diameter is about 62.5 µm, and the second core diameter is about 50 µm.

The present disclosure also provides for a method for fabricating an optical device wherein a first cleaved end of the first core profile zone includes a first outer diameter, and a second cleaved end of the second core profile zone includes a second outer diameter, the first outer diameter substantially the same size as the second outer diameter.

The present disclosure also provides for a method for fabricating an optical device wherein the transition zone core diameter tapers at an angle of less than about one degree from the first core diameter to the second core diameter.

The present disclosure also provides for a method for fabricating an optical device further including cleaving the optical fiber at a third core profile zone having a third core diameter and cleaving the optical fiber at a fourth core profile zone having a fourth core diameter, with a second transition zone extending from the third core profile zone to the fourth core profile zone; wherein the third core diameter is substantially the same size as the first core diameter, and the fourth core diameter is substantially the same size as the second core diameter.

The present disclosure also provides for a method for fabricating an optical device wherein the first core profile zone includes one core, and the second core profile zone includes two or more cores, and the first transition zone includes the two or more cores; wherein the two or more cores in first transition zone are connected to and extend from the two or more cores in the second core profile zone, and the two or more cores in the first transition zone are connected to and extend from the one core in the first core profile zone.

The present disclosure also provides for a method for fabricating an optical device wherein the first core profile zone extends from a first cleaved end to a first transition point positioned proximal to a first end of the first transition zone; wherein the second core profile zone extends from a second cleaved end to a second transition point positioned proximal to a second end of the first transition zone; wherein the first transition zone extends from the first transition point to the second transition point; and wherein the two or more cores in the first transition zone angle downwardly from the second transition point to the first transition point and connect with the one core in the first core profile zone.

The present disclosure also provides for a method for fabricating an optical device wherein proximal to the first transition point the one core in the first core profile zone splits off into the two or more cores of the first transition zone, the two or more cores angling upwards from the first transition point to the second transition point.

The present disclosure also provides for a method for fabricating an optical device wherein the one core in the first core profile zone extends from the first cleaved end to the first transition point, and the two or more cores in the second core profile zone extend from the second cleaved end to the second transition point.

The present disclosure also provides for a method for fabricating an optical device wherein the first core profile zone is fabricated by irradiating the optical fiber at a first level, and the second core profile zone is fabricated by irradiating the optical fiber at a second level, the first level different than the second level.

The present disclosure also provides for a method for fabricating an optical device including providing an optical fiber, the optical fiber having two or more core profile zones that vary cyclically a plurality of times along the length of the optical fiber, with transition zones in between each successive varied core profile zone of the optical fiber; cleaving the optical fiber at a first core profile zone having a first core diameter; and cleaving the optical fiber at a second core profile zone having a first core diameter, with a first transition zone extending from the first core profile zone to the second core profile zone; wherein the first core diameter is different than the second core diameter; wherein the first transition zone includes a transition zone core diameter that tapers from the first core diameter of the first core profile zone to the second core diameter of the second core profile zone; wherein the first core profile zone extends from a first cleaved end to a first transition point positioned proximal to a first end of the first transition zone; wherein the second core profile zone extends from a second cleaved end to a second transition point positioned proximal to a second end of the first transition zone; wherein the first transition zone extends from the first transition point to the second transition point; wherein the optical fiber is cleaved at the mid-point of the first core profile zone, and the optical fiber is cleaved at the mid-point of the second core profile zone; wherein the first and second core diameters are surrounded by cladding; wherein the transition zone core diameter is connected to and extends from the first core diameter to the second core diameter, with the transition zone core diameter tapering from the first core diameter to the second core diameter; and wherein a first cleaved end of the first core profile zone includes a first outer diameter, and a second cleaved end of the second core profile zone includes a second outer diameter, the first outer diameter substantially the same size as the second outer diameter.

The present disclosure also provides for a method for fabricating an optical device including providing an optical fiber, the optical fiber having two or more core profile zones that vary cyclically a plurality of times along the length of the optical fiber, with transition zones in between each successive varied core profile zone of the optical fiber; cleaving the optical fiber at a first core profile zone; and cleaving the optical fiber at a second core profile zone, with a first transition zone extending from the first core profile zone to the second core profile zone; wherein the first core profile zone is different than the second core profile zone; wherein the first core profile zone includes one core, and the second core profile zone includes two or more cores, and the first transition zone includes the two or more cores; wherein the two or more cores in first transition zone are connected to and extend from the two or more cores in the second core profile zone, and the two or more cores in first transition zone are connected to and extend from the one core in the first core profile zone; wherein the first core profile zone extends from a first cleaved end to a first transition point positioned proximal to a first end of the first transition zone; wherein the second core profile zone extends from a second cleaved end to a second transition point positioned proximal to a second end of the first transition zone; and wherein the first transition zone extends from the first transition point to the second transition point; wherein the two or more cores in the first transition zone angle downwardly from the second transition point to the first transition point and connect with the one core in the first core profile zone; wherein proximal to the first transition point the one core in the first core profile zone splits off into the two or more cores of the first transition zone, the two or more cores angling upwards from the first transition point to the second transition point; wherein the optical fiber is cleaved at the mid-point of the first core profile zone, and the optical fiber is cleaved at the mid-point of the second core profile zone; wherein the first and second core diameters are surrounded by cladding; and wherein the first cleaved end of the first core profile zone includes a first outer diameter, and the second cleaved end of the second core profile zone includes a second outer diameter, the first outer diameter substantially the same size as the second outer diameter.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein.

DETAILED DESCRIPTION OF DISCLOSURE

Figure 1:
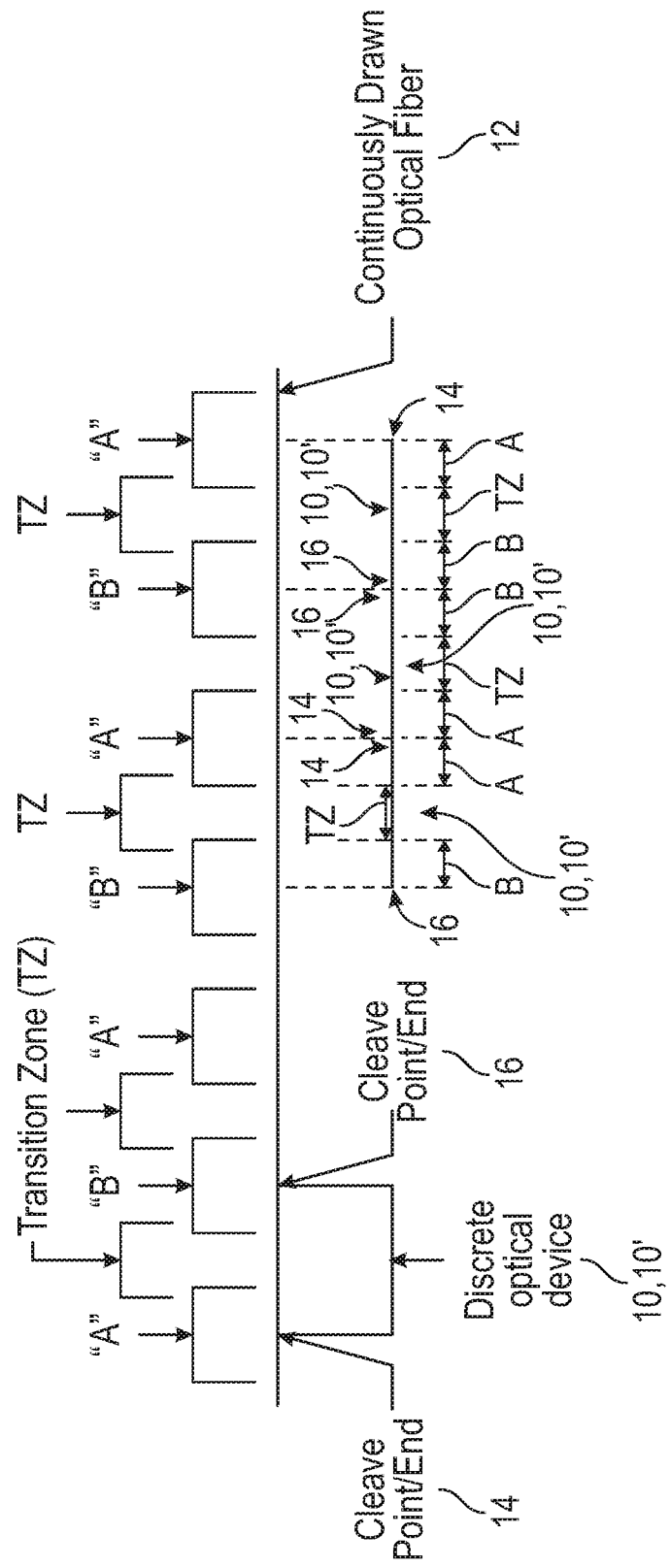
FIG. 1 is a schematic of an exemplary cyclic core variance process/method for fabricating optical devices, according to the present disclosure.

The exemplary embodiments disclosed herein are illustrative of advantageous optical devices (e.g., discrete passive optical devices), and systems of the present disclosure and fabrication methods/techniques thereof. It should be understood, however, that the disclosed embodiments are merely exemplary of the present disclosure, which may be embodied in various forms. Therefore, details disclosed herein with reference to exemplary optical devices/fabrication methods and associated processes/techniques of assembly and use are not to be interpreted as limiting, but merely as the basis for teaching one skilled in the art how to make and use the advantageous optical devices/systems and/or alternative optical devices/systems of the present disclosure.

The present disclosure provides improved optical devices (e.g., discrete passive optical devices), and improved systems and methods for fabricating such optical devices. More particularly, the present disclosure provides advantageous systems and methods for fabricating discrete passive optical devices by utilizing an advantageous cyclic core variance fabrication process/method.

Referring now to the drawings, like parts are marked throughout the specification and drawings with the same reference numerals, respectively. Drawing figures are not necessarily to scale and in certain views, parts may have been exaggerated for purposes of clarity.

FIG. 1 is a schematic of an exemplary cyclic core variance process/method for fabricating optical devices 10 (or 10', etc.) according to the present disclosure.

In general, the cyclic core variance process/method as depicted in FIG. 1 can utilize some processes of optical fiber production (both glass and plastic optical fiber) to fabricate optical devices 10, 10' (e.g., discrete passive optical devices 10, 10').

It is noted that conventional optical fiber is produced using a constant core profile embedded within a cladding with a higher index of refraction. This allows long, continuous runs of optical fiber to be produced at acceptable cost.

The exemplary cyclic core variance process/method of the present disclosure employs a continuous process. However, instead of having one constant core profile of the optical fiber, the core profile of the optical fiber varies cyclically, going back and forth between two or more core profile zones a plurality of times along the length of the optical fiber, with a transition zone TZ (e.g., a gradual and properly-shaped transition zone) in between each successive varied core profile zone of the optical fiber. FIG. 1 illustrates an exemplary process/method of how this is accomplished.

It is noted that the cyclic core variance processes/methods of the present disclosure are not limited to just two core profiles (e.g., zone A and zone B), and that repeating cycles of more than two core profiles (e.g., zones A, B and C; etc.) may also be utilized in some applications/methods.

In certain embodiments and as discussed further below, each transition zone TZ includes a transition zone core profile having a transition zone core diameter that tapers (e.g., gradually tapers) between each respective successive varied core profile zone of the optical fiber 12.

As shown in FIG. 1, an optical fiber 12, being continuously produced (e.g., drawn for glass optical fiber 12 production; or extruded for plastic optical fiber 12 production), alternates at least between a plurality of core profile zones A and core profile zones B a plurality of times along the length of the optical fiber 12.

A transition zone TZ (e.g., a gradual and properly-shaped transition zone TZ) is positioned in between each successive varied core profile zones A and B of the optical fiber 12.

Figure 3:
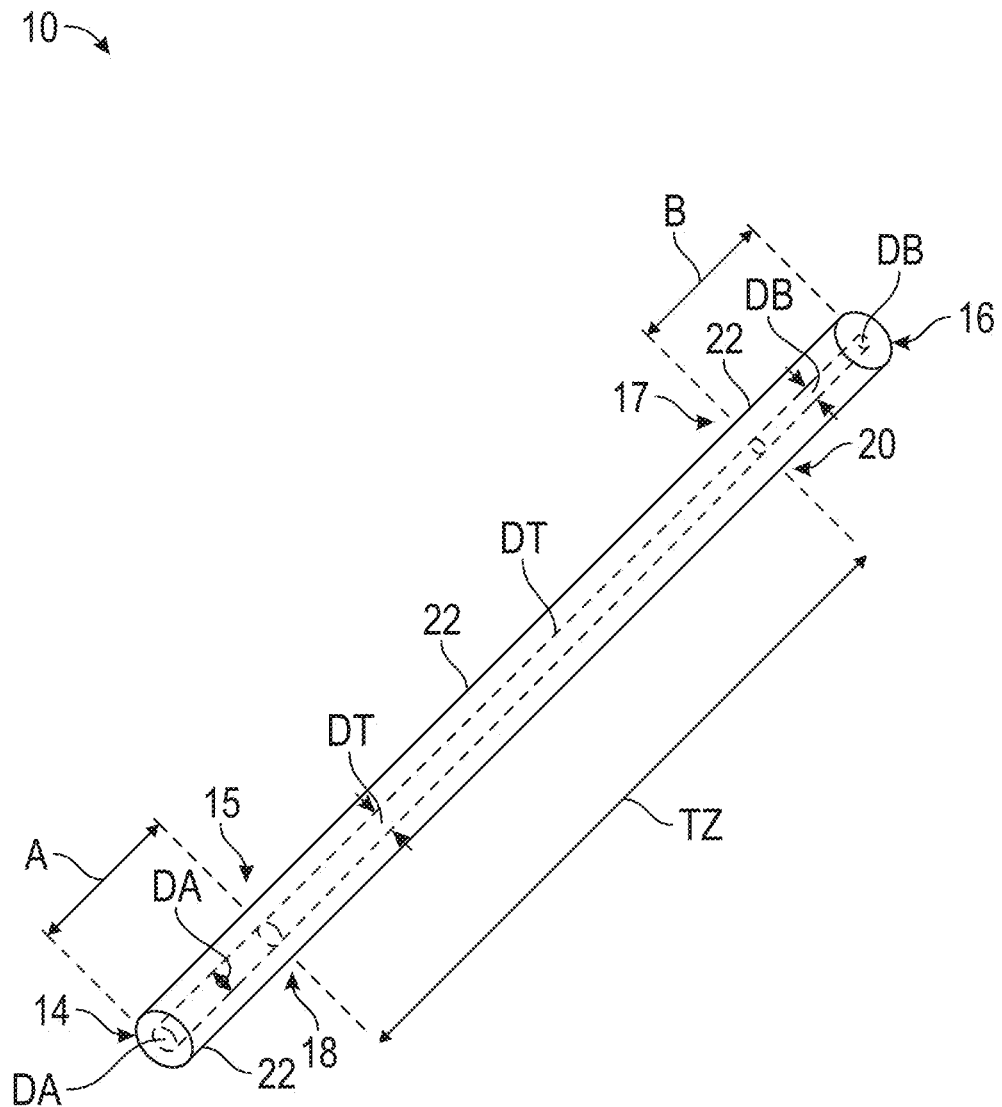
FIG. 3 is a side perspective view of the exemplary optical device of FIGS. 2A-2B.
Figure 4:
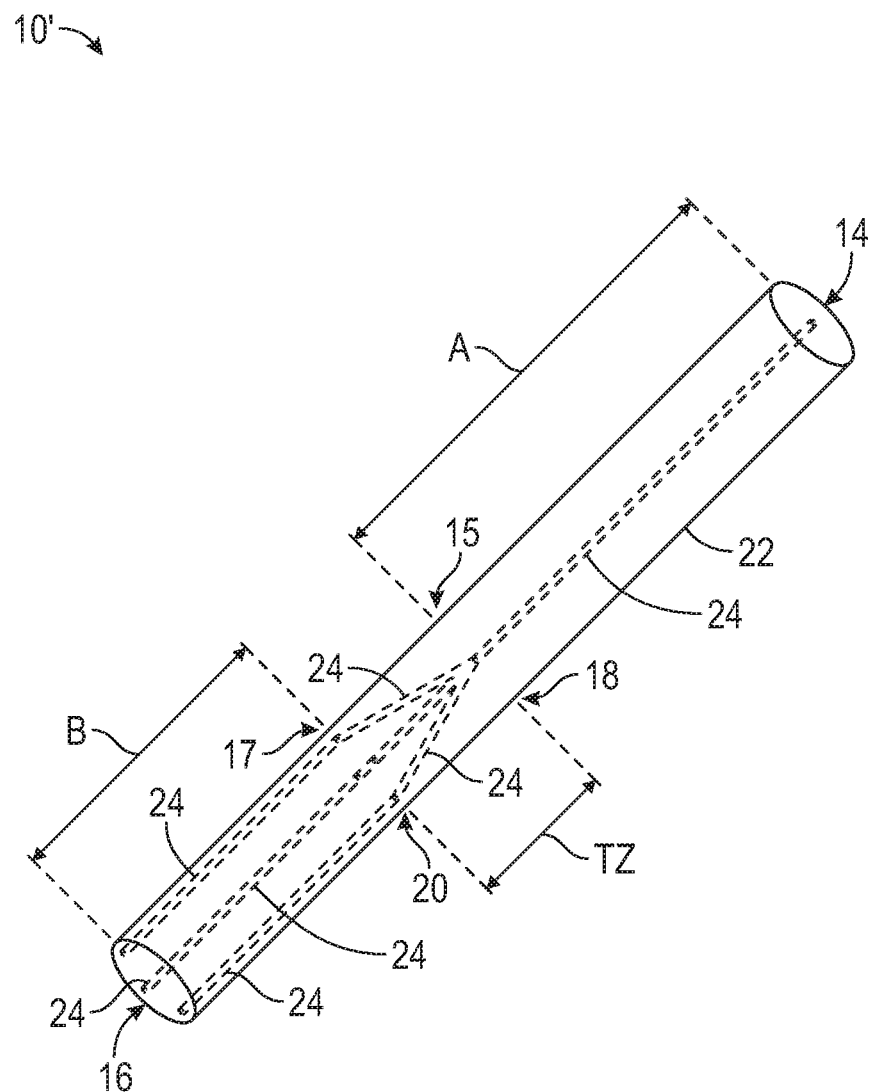
FIG. 4 is a side perspective view of the exemplary optical device of FIGS. 2C-2D.

As shown in FIGS. 1, 3 and 4, by cleaving the fiber 12 repeatedly in each core profile zone A and B (e.g., in the center or mid-point of each core profile zone A and B), a plurality of discrete lengths/devices 10, 10' from fiber 12 can be fabricated, with core profile zone A extending from one cleaved end 14 of length/device 10, 10', and with core profile zone B extending from the other cleaved end 16 of length/ device 10, 10', and with a transition zone TZ positioned between core profile zones A and B for each discrete length/device 10, 10' fabricated. It is noted that the cleaving process can utilize a method of cleaving optical fiber as is used in mechanical splicing or fusion splicing of optical fiber.

As such, for each discrete length/device 10, 10' fabricated from fiber 12, each length/device 10, 10' includes a core profile zone A extending from one cleaved end 14 to a transition point 15 positioned proximal to a first end 18 of the transition zone TZ, a core profile zone B extending from the other cleaved end 16 to a transition point 17 positioned proximal to a second end 20 of the transition zone TZ, and with the transition zone TZ extending from first end 18 to second end 20 (e.g., TZ extending from transition point 15 of core profile zone A to transition point 17 of core profile zone B).

As shown in FIG. 1, for every cycle of core profile zone A to core profile zone B and back to core profile zone A of fiber 12, two substantially identical discrete lengths/devices 10, 10' can be produced, with opposing orientation of the two substantially identical discrete lengths/devices 10, 10'.

The core profile zones A, B, etc., and transition zone TZ can be custom formed (e.g., user-defined) to produce/fabricate a variety of optical effects of device 10, 10' as desired, thereby allowing a large variety of optical devices 10, 10' to be fabricated utilizing the exemplary cyclic core variance process/method of the present disclosure.

It is noted that the cyclic core variance process/method of the present disclosure can be used to cheaply mass produce substantially any passive optical device intended to connect with optical fiber. As long as the optics are physically possible, the cyclic core variance process/method of the present disclosure generally can be used to make the devices in large numbers at low cost.

Figure 2:
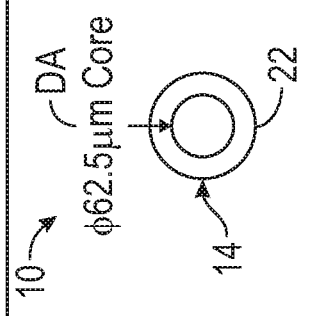
FIGS. 2A-2B show end views of varying core profile zones of an exemplary optical device fabricated from a cyclic core variance process/method of the present disclosure.
FIGS. 2C-2D show end views of varying core profile zones of another exemplary optical device fabricated from a cyclic core variance process/method of the present disclosure.

FIGS. 2A-2B show end views 14, 16 of varying core profile zones A, B of an exemplary optical device 10 fabricated from a cyclic core variance process/method of the present disclosure.

FIGS. 2C-2D show end views 14, 16 of varying core profile zones A, B of another exemplary optical device 10' fabricated from a cyclic core variance process/method of the present disclosure.

As shown in FIGS. 2A-2B and 3, exemplary optical device 10 takes the form of an adapter link 10.

Exemplary optical device 10 allows a low-loss connection between fiber having a core diameter DA (e.g., OM1 fiber having a 62.5 μm core diameter DA) in core profile zone A, and fiber having a core diameter DB (e.g., OM3 fiber having a slightly smaller 50 μm core diameter DB) in core profile zone B.

In general and as depicted in FIG. 3, core diameter DA (e.g., about 62.5 μm core diameter DA) of core profile A is surrounded by cladding 22, and core diameter DA extends from cleaved end 14 to the transition point 15 positioned proximal to first end 18 of the transition zone TZ.

Core diameter DB (e.g., about 50 μm core diameter DB) of core profile B is surrounded by cladding 22, and core diameter DB extends from other cleaved end 16 to the transition point 17 positioned proximal to second end 20 of the transition zone TZ.

The transition zone TZ of device 10 extends from first end 18 to second end 20 (e.g., TZ extends from transition point 15 of core profile zone A to transition point 17 of core profile zone B).

Exemplary transition zone TZ of device 10 includes a transition zone core profile having a core diameter DT that is surrounded by cladding 22, with the core diameter DT tapering (e.g., gradually tapering) from first end 18 to second end 20 of the transition zone TZ. As such, the diameter of exemplary core diameter DT tapers (e.g., gradually tapers) from a diameter of about 62.5 μm proximal to first end 18 and proximal to transition point 15, and tapers to a diameter of about 50 μm proximal to second end 20 and proximal to transition point 17. As such, core diameter DT is connected to and extends from core diameter DA to core diameter DB, with the core diameter DT tapering from core diameter DA to core diameter DB.

With reference again to FIG. 1, it is noted that each core profile zone A of optical fiber 12 can include fiber having a larger core diameter DA (e.g., OM1 fiber having a 62.5 μm core diameter DA) in each core profile zone A of fiber 12, and each core profile zone B of optical fiber 12 can include fiber having a smaller core diameter DB (e.g., OM3 fiber having a slightly smaller 50 μm core diameter DB in each core profile zone B of fiber 12), although the present disclosure is not limited thereto.

In other embodiments, each core profile zone A of optical fiber 12 can include fiber having a smaller core diameter DA in each core profile zone A of fiber 12, and each core profile zone B of optical fiber 12 can include fiber having a larger core diameter DB. It is noted that fibers other than OM1 and/or OM3 having different core diameters can be utilized in fiber 12 and in zones A and/or B to produce/fabricate devices 10.

Conventional practice provides that direct mating of a larger diameter fiber (e.g., OM1 fiber having a 62.5 μm core diameter) with a smaller diameter fiber (e.g., OM3 fiber having a 50 μm core diameter) involves a connection with a core mismatch, leading to large insertion loss (e.g., about 3.5 dB) and high signal reflection when going from the larger diameter fiber (e.g., OM1 fiber) to the smaller diameter fiber (e.g., OM3 fiber).

Each adapter link 10 produced using the cyclic core variance process/method of the present disclosure transitions smoothly (e.g., with the core diameter DT gradually tapering from zone A to zone B) between the core profile zones A and B, with minimal insertion loss and low signal reflection. It is noted that each device or adapter link 10 fabricated from the cyclic core variance process/method can utilize a glass optical fiber 12 (e.g., drawn glass optical fiber 12) or a plastic optical fiber 12 (e.g., extruded plastic optical fiber 12), as discussed further below.

As shown in FIG. 3, the larger core diameter fiber (e.g., OM1 fiber having a 62.5 μm core diameter DA) is in front (left side of FIG. 3), and the smaller core diameter fiber (e.g., OM3 fiber having a 50 μm core diameter DB) is in the back.

In certain embodiments, it is noted that the outer diameter of end 14 and of zone A (e.g., 125 μm outer diameter of core DA plus surrounding cladding 22) can be substantially equal to the outer diameter of end 16 and of zone B (e.g., 125 μm outer diameter of core DB plus surrounding cladding 22), and can be substantially equal to the outer diameter of the transition zone TZ (e.g., 125 μm outer diameter of tapering core DT plus surrounding cladding 22), although the present disclosure is not limited thereto.

In certain embodiments, the transition zone TZ between core profile zones A and B includes an almost imperceptible taper of core diameter DT tapering from zone A to zone B, which in some applications can be drawn out over a meter or more. Over such lengths, the taper angle of core diameter DT tapering from zone A to zone B is almost zero (e.g., about 0.00036 degrees over a one-meter length of the TZ from zone A to zone B; tapers at an angle of less than about one degree from the first core diameter to the second core diameter), which can minimize insertion loss on higher-order modes, as well as limit modal dispersion.

With reference now to FIG. 4, another exemplary optical device 10' fabricated from a cyclic core variance process/method of the present disclosure is depicted. In general, optical device 10' is fabricated from glass optical fiber 12 (e.g., drawn glass optical fiber 12) or the like.

FIGS. 2C-2D show end views 14, 16 of varying core profile zones A, B of optical device 10'. As shown in FIGS. 2C-2D and 4, exemplary optical device 10' takes the form of an optical splitter 10' (e.g., a 1×4 optical splitter, as can be utilized in passive optical LAN (POL) applications). As depicted in FIG. 4, device 10' fabricated from cleaved fiber 12 includes core profile zone A, core profile zone B, and transition zone TZ positioned between zones A and B.

In general, zone A of device 10' transitions, via transition zone TZ, from a fiber having a first profile in zone A to a second profile in zone B.

In an exemplary embodiment, the first profile in zone A includes a single core 24 (e.g., a single nine-µm singlemode core 24) surrounded by cladding 22. Exemplary second profile in zone B includes two or more cores 24 (e.g., four nine-µm cores 24) surrounded by cladding 22. The two or more cores 24 (e.g., four cores 24) in transition zone TZ are connected to and extend from the cores 24 in zone B, and the cores 24 in transition zone TZ angle downwardly from zone B to zone A (FIG. 4) and connect with the core 24 in zone A. At transition point 15, the single core 24 of zone A begins to split off into the four cores 24 of zone B and the TZ, the four cores 24 thereby beginning to angle upwards from transition point 15 and first end 18 of TZ to the second end 20 and transition point 17 of zone B.

As such, optical device 10' advantageously divides the energy from a single input 24 four ways, and merges the energy from the four legs/cores 24 into the one for light traveling in the other direction.

In general and as depicted in FIG. 4, core 24 of zone A extends from cleaved end 14 to the transition point 15 positioned proximal to first end 18 of the transition zone TZ.

The four cores 24 of zone B extend from other cleaved end 16 to the transition point 17 positioned proximal to second end 20 of the transition zone TZ.

The transition zone TZ of device 10' extends from first end 18 to second end 20 (e.g., TZ extends from transition point 15 of core profile zone A to transition point 17 of core profile zone B).

As noted, the four cores 24 in transition zone TZ angle downwardly from zone B to zone A (e.g., from second end 20 to first end 18).

In other embodiments, it is noted that zone A could include other numbers of cores 24 (e.g., two, three, four, a plurality, etc.), and that zone B could include other numbers of cores 24 (e.g., one, two, three, a plurality, etc.), and that the TZ could include other numbers of cores 24 (e.g., one, two, three, a plurality, etc.). In general, device 10' is configured and dimensioned to transition, via transition zone TZ, from a fiber having a first profile (e.g., having a certain number of cores 24) in zone A to a second profile (e.g., having a certain number of cores 24) in zone B.

Current practice provides that conventional splitter technology has symmetrical loss, that is, the loss in the splitting direction can be equal to that in the merging direction. For example, a basic element of both a fused biconical taper (FBT) and a planar lightwave circuit (PLC) is actually a 2×2 splitter element, with one of the input ends cut away. This lead still collects its share of energy in the merging direction, but this energy is simply lost.

However, the optical device 10' fabricated from a cyclic core variance process/method of the present disclosure is truly convergent, meaning that very little energy would be lost in the merge (of cores 24), reducing the requisite transmission power of the connected optical network terminals (ONTs). So, in addition to being less expensive to produce than FBT- and PLC-based splitters, the exemplary splitter/device 10' is more energy efficient and can advantageously enable additional cost savings within the connected hardware.

In certain embodiments, it is noted that the outer diameter of end 14 and of zone A (e.g., 125 µm outer diameter of core 24 plus surrounding cladding 22) of device 10' can be substantially equal to the outer diameter of end 16 and of zone B (e.g., 125 µm outer diameter of cores 24 plus surrounding cladding 22), and can be substantially equal to the outer diameter of the transition zone TZ (e.g., 125 µm outer diameter of angled cores 24 plus surrounding cladding 22), although the present disclosure is not limited thereto.

In general, the applications of devices 10, 10' may be limited by the core profile zones (e.g., zones A and B) which can be worked into the devices 10, 10'.

For glass fiber production for fabricating glass fiber 12, this could be accomplished by carefully crafting the preform to draw out to the desired shape of fiber 12, and once accomplished, the desired devices 10, 10' could be produced by the thousands or more, at a cost of a few cents each.

For glass fiber production for fabricating glass fiber 12, instead of having a uniform cross section, the preform could be made with a cross section which varies cyclically, and which once drawn to its final diameter could take the interior core profile desired, both in the steady state zones (zones "A" and "B"), and in the transition zones. It is noted that the natural behavior of glass, and particularly the boundary area between core and cladding material, can be favorable for the systems/methods of the present disclosure.

For plastic optical fiber production for fabricating plastic optical fiber 12, the process is a bit different, whereby the cladding 22 is created by bombarding the outside of the fiber 12 with radiation as it is extruded. In this case, one could vary the radiation profile cyclically during the extrusion process, thereby allowing continuous production of fiber 12 at low cost.

In exemplary embodiments and for plastic optical fiber production for fabricating plastic optical fiber 12, the plastic is extruded at its final diameter, and then the outside of it is irradiated to change its optical properties—in effect, "burning in" a cladding layer on the outside. This process could be comparatively user-friendly to fabricate an exemplary adapter link 10 shown in FIG. 3.

In certain embodiments, the output power of the irradiation can determine the depth of the cladding 22, and thus the final size of the core region (e.g., DA, DB, DT). More power means deeper cladding 22 (e.g., for zone B), which in turn means a smaller core diameter (e.g., for diameter DB).

To fabricate an exemplary adapter link 10 of FIG. 3, a lower power irradiation could be employed to form zone "A" (e.g., 62.5 µm core diameter DA), and a higher power irradiation to form zone "B" (e.g., 50 µm core diameter DB). In the transition zone, the output power could be slowly ramped from one level to the other (e.g., from end 18 to end 20 of TZ). The fiber could be extruded continuously, and irradiated as it is extruded.

Further, it is noted that exemplary cyclic core variance methods of the present disclosure can produce fibers 12 with a constant cladding 22 diameter, which in turn can advantageously ensure compatibility with current, low-cost fiber alignment and termination techniques.

In general, the cyclic core variance systems/methods of the present disclosure can enable a wide range of passive optical devices 10, 10' to be mass-produced at extremely low cost. It is noted that some competing conventional assemblies are attempted to be fabricated utilizing more expensive processes, exhibit lower performance, and in many cases, cannot be produced (e.g., economically) at all. Some conventional device examples include optical filters, multiplexers/demultiplexers, self-focusing lenses, and many others.

The cyclic core variance system/method of the present disclosure is inherently a low-cost, high-volume production process, with an added advantage of superior device 10, 10' performance in many applications.

It is noted that the transition zone TZ between the steady-state profiles (core profile zones A, B) can vary in length and sometimes can be just a point (sudden step) change (e.g., as it may be for a Bragg Grating device fabricated with the cyclic core variance system/method of the present disclosure).

In some implementations of the cyclic core variance system/method of the present disclosure, the transition zone TZ may be required to modify the launch condition of a given optical signal, or otherwise passively process the signal, during its passage through the transition. This can be accomplished by means of lens (refractive) and mirror (reflective) elements, which themselves are merely step changes in the core region's index of refraction, shaped to perform the intended optical function. These optical functions can be performed within the transition zone TZ at least three different ways: (i) discretely—by a single major lens/mirror element located within the transition zone TZ, or at one end of it; (ii) progressively—by a series of minor lens/mirror elements dispersed along the length of the transition zone TZ; or (iii) continuously—where the whole transition zone TZ has a three-dimensional graded index profile which performs the required optical function(s). In theory, any of these three methods could be employed for any given device, but as a practical matter, the technical, performance, and cost requirements of a particular device will generally tend to make one option clearly preferable to the other two.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for fabricating an optical device, comprising:
   fabricating a continuous optical fiber, the continuous optical fiber having two or more core profile zones that vary cyclically a plurality of times along a longitudinal length of the continuous optical fiber, with transition zones in between each successive varied core profile zone of the continuous optical fiber, wherein the longitudinal length of the continuous optical fiber has a proximal end and a distal end;
   wherein the two or more core profile zones include at least a first core profile zone having a first single core with a first core diameter, and a second core profile zone having a second single core with a second core diameter, wherein the first core diameter is dimensioned differently from the second core diameter;
   wherein (i) the first core profile zone extends along the longitudinal length of the continuous optical fiber from a first end to a second end, and the second core profile zone extends along the longitudinal length of the continuous optical fiber from a third end to a fourth end, (ii) the first core profile zone defines a first core profile zone length from the first end to the second end, and the second core profile zone defines a second core profile zone length from the third end to the fourth end, (iii) each of the first and second core profile zones defines a steady-state zone along the respective first and second core profile zone lengths, and (iv) the steady-state zone defines a constant core profile in the form of the first core diameter of the first single core extending constantly along the first core profile zone length and the second core diameter of the second single core extending constantly along the second core profile zone length;
   wherein the transition zones extend along the longitudinal length of the continuous optical fiber and gradually taper between the first core diameter and the second core diameter of each successive varied core profile zone of the continuous optical fiber, wherein the transition zones each define a transition zone longitudinal length dimensioned greater than zero; and
   wherein an outer diameter of the continuous optical fiber remains constant along an entire longitudinal length of the continuous optical fiber.

2. The method of claim 1, wherein the first core diameter is about 62.5 µm, and the second core diameter is about 50 µm.

3. The method of claim 1, wherein the continuous optical fiber is a glass optical fiber or a plastic optical fiber.

4. The method of claim 1, wherein the transition zones include a transition zone core diameter that tapers from the first core diameter of the first core profile zone to the second core diameter of the second core profile zone, and that tapers from the second core diameter of the second core profile zones to the first core diameter of the first core profile zone.

5. The method of claim 4, wherein the transition zone core diameter is connected to and extends from the first core diameter to the second core diameter, with the transition zone core diameter tapering from the first core diameter to the second core diameter.

6. The method of claim 5, wherein the first core diameter is about 62.5 µm, and the second core diameter is about 50 µm.

7. The method of claim 5, wherein the transition zone core diameter tapers at an angle of less than about one degree from the first core diameter to the second core diameter.

8. The method of claim 1, wherein the two or more core profile zones include a third core profile zone that is substantially the same as the first core profile zone, and a fourth core profile zone that is substantially the same as the second core profile zone.

9. The method of claim 1, wherein the first and second core diameters are surrounded by cladding.

10. The method of claim 1, wherein the first core profile zone includes one core, and the second core profile zone includes two or more cores, and one of the transition zones includes the first transition zone includes the two or more cores;
wherein the two or more cores in the one of the transition zones first transition zone are connected to and extend from the two or more cores in the second core profile zone, and the two or more cores in the one of the transition zones the first transition zone are connected to and extend from the one core in the first core profile zone.

11. The method of claim 10, wherein the first core profile zone extends from a first cleaved end to a first transition point positioned proximal to a first end of the one of the transition zones the first transition zone;
wherein the second core profile zone extends from a second cleaved end to a second transition point positioned proximal to a second end of the one of the transition zones the first transition zone;
wherein the one of the transition zones the first transition zone extends from the first transition point to the second transition point; and
wherein the two or more cores in the one of the transition zones the first transition zone angle downwardly from the second transition point to the first transition point and connect with the one core in the first core profile zone.

12. The method of claim 11, wherein proximal to the first transition point the one core in the first core profile zone splits off into the two or more cores of the one of the transition zones the first transition zone, the two or more cores angling upwards from the first transition point to the second transition point.

13. The method of claim 11, wherein the one core in the first core profile zone extends from the first cleaved end to the first transition point, and the two or more cores in the second core profile zone extend from the second cleaved end to the second transition point.

14. The method of claim 2, wherein the first core profile zone is fabricated by irradiating the optical fiber at a first level, and the second core profile zone is fabricated by irradiating the optical fiber at a second level, the first level different than the second level.

15. The method of claim 1, wherein the fabricating step comprises continuously producing the two or more fiber core profile zones and the transition zones of the continuous optical fiber by drawing or extrusion such that the continuous optical fiber is a single continuous optical fiber.

16. The method of claim 1, wherein the two or more core profile zones are configured to transmit an optical signal along the two or more core profile zones.

17. The method of claim 1, wherein the fabricating step comprises forming the two or more core profile zones and the transition zones simultaneous to a drawing step or an extrusion step for forming the continuous optical fiber.

* * * * *